March 31, 1964     A. E. REVELL     3,127,258
UNIT FILTER ASSEMBLY
Filed March 28, 1960     2 Sheets-Sheet 1
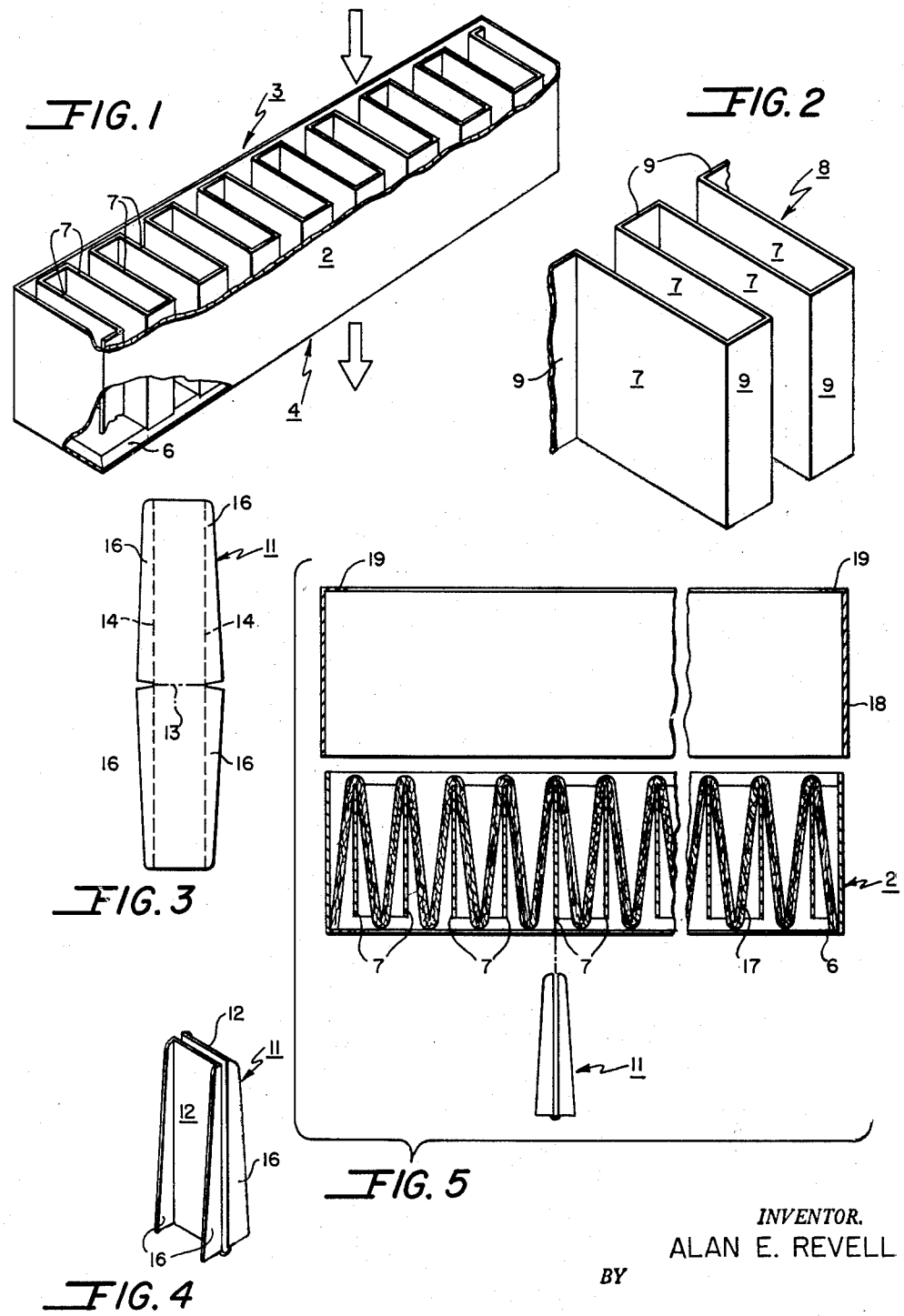
INVENTOR.
ALAN E. REVELL
BY
Ralph Q. Quick
ATTORNEY

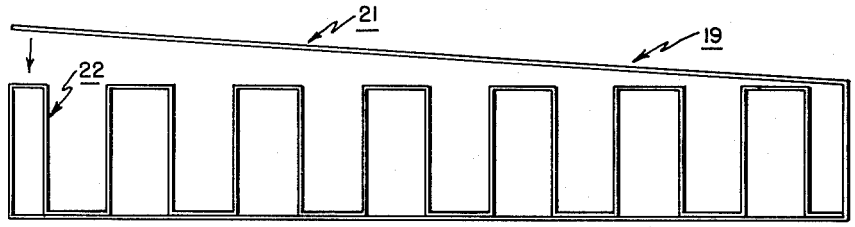
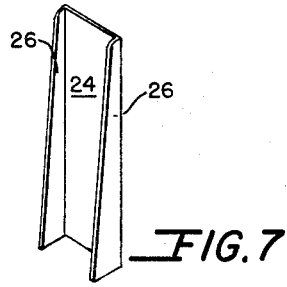
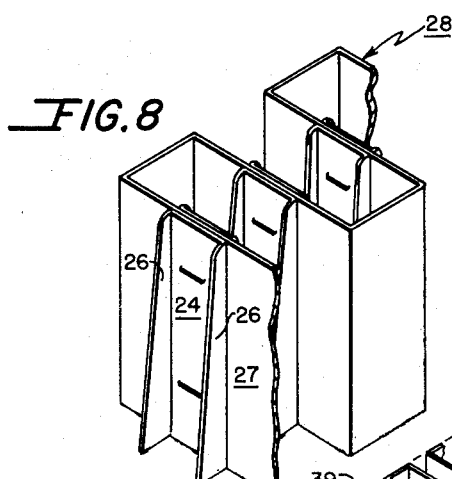
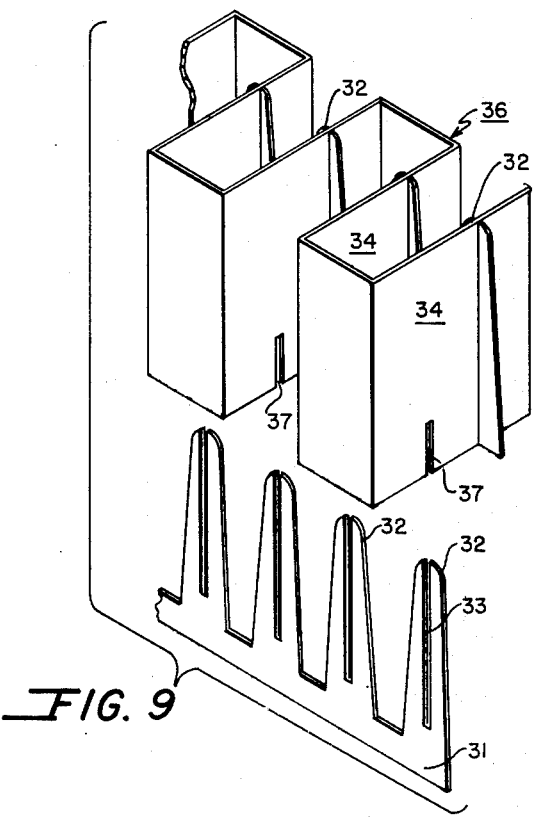
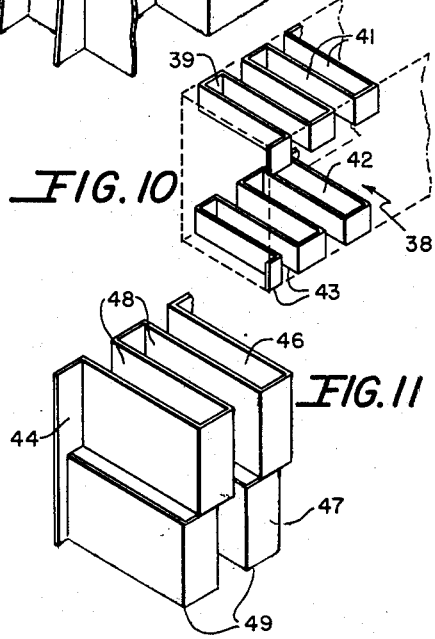
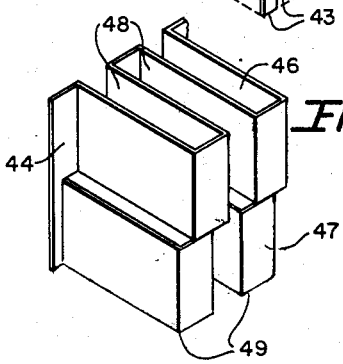
INVENTOR.
ALAN E. REVELL United States Patent Office 3,127,258
Patented Mar. 31, 1964

3,127,258
UNIT FILTER ASSEMBLY
Alan E. Revell, Jeffersontown, Ky., assignor to American Air Filter Company, Inc., Louisville, Ky., a corporation of Delaware
Filed Mar. 28, 1960, Ser. No. 18,093
13 Claims. (Cl. 55—499)

The present invention relates to filter asemblies and more particularly to unit filter assemblies of the pleated, disposable type.

In accordance with the present invention, a unit filter assembly structure is provided which can be readily and efficiently produced in mass quantities with a minimum of operations and materials, the resulting filter structure providing a maximum filtering area with a minimum of resistance to the fluid stream to be treated thereby. In addition, the filter structure of the present invention lends itself to ready installation into and removal from a fluid stream to be treated, the materials required for the inventive structure being sufficiently economical in nature as to permit construction of a disposable type unit filter.

Various other features of the present invention will become obvious to one skilled in the art upon reading the description set forth hereinafter.

More specifically, the present invention provides a unit filter assembly comprising an open-ended frame, a filter medium disposed in the frame in pleated form across the fluid stream to be treated with the edges and ends of the filter medium being sealed to the inside walls of the frame, a plurality of spaced support members extending between the walls of the frame in parallel, supporting relationship along the length of the crests of the pleats of the filter medium at least at one of the open ends of the frame, and pleat contour means cooperating with the support members to maintain the lateral sides of the pleats of the medium adjacent the supported crests in preselected contoured form against the pressure of the fluid stream to be treated. In addition, the present invention provides a novel unit filter assembly structure of the pleated type wherein the open-ended frame member and support members for the pleats of the filter medium can be provided from a continuous strip of sturdy, pliant material. Further, the present invention provides a number of novel, structural arrangements for the pleat contour means in the form of rib members which engage against the lateral sides of the pleats of the filter medium to support the pleats of the medium against the pressure of the fluid stream to be treated by the medium.

It is to be understood that various changes can be made by one skilled in the art in the arrangement, form and construction of the filter assembly structure disclosed herein without departing from the scope or spirit of the present invention.

Referring to the drawings:

FIGURE 1 is a partially broken away, perspective view of one embodiment of a portion of a unit filter assembly of the present invention, disclosing an open-ended frame with pleat support members disposed therein;

FIGURE 2 is an enlarged isometric view of a portion of the pleat support members of FIGURE 1;

FIGURE 3 is a face view of one form of pleat contour blank which can be erected for use with the support members of FIGURE 2;

FIGURE 4 is an isometric view of the pleat contour blank of FIGURE 3 in erected position;

FIGURE 5 is an exploded, cross-sectional side view of the filter asembly structure of FIGURES 1–4, disclosing the pleated filter medium in position in an inner open-ended frame with an outer open-ended frame member arranged to be telescoped into engagement therewith;

FIGURE 6 is a plan view of one embodiment of the present invention, disclosing an arrangement wherein an open-ended frame member and support members for the pleats of the filter medium can be formed from a continuous strip of sturdy, plinat material;

FIGURE 7 is an isometric view of another form of pleat contour means which can be used with support members like that of FIGURE 2;

FIGURE 8 is an isometric view of a portion of a support member incorporating the pleat contour means of FIGURE 7;

FIGURE 9 is an exploded isometric view of still another form of pleat contour means which can be used with support members like that of FIGURE 2;

FIGURE 10 is a perspective view of a portion of a unit filter assembly of the present invention, disclosing a further structural arrangement of the pleat support members; and FIG. 11 is an enlarged isometric view of a portion of a pleat support member similar to that of FIGURE 1 but divided and folded to afford the features of the structure of FIGURE 10.

As can be seen in FIGURES 1–5 of the drawings, the uni filter assembly of the present invention includes an open-ended frame member 2 having an upstream opening 3 and downstream opening 4 (as indicated by the flow arrows). Advantageously, frame member 2 can be of a four wall rectangular shape and can be formed from a sturdy, pliant but inexpensive material such as cardboard or chipboard. The frame member 2, as disclosed, is provided with an integral border member 6 which surrounds the downstream opening 4. It is to be understood that border member 6 is not an essential to the present invention; however, it does serve to perform a useful filter medium support function, as will be described more fully hereinafter.

Disposed within frame member 2 transverse to and between opposite walls of the frame member are a plurality of spaced, parallel support members 7. These support members 7 advantageously can be formed from a single, continuous strip 8 of sturdy, pliant material such as chipboard or cardboard. Strip 8 is inserted in open-ended frame 2 to extend back and forth between opposite walls of the frame in serpentine fashion so as to provide the spaced, parallel support members 7. To hold strip 8 in proper position within frame 2, portions 9 of the strip, which are intermediate support members 7, engage in abutting relationship against the walls of frame 2 and can be fastened thereto by some suitable means, such as gluing or stapling.

Arranged to cooperate with strip 8 are pleat contour members 11 (FIGURE 3), which can be fastened to each of support members 7 of strip 8. As can be seen in FIGURE 3, each pleat contour member 11 is in the form of a panel strip having a transverse fold line 13 extending intermediate its end extremities and spaced, longitudinally extending fold lines 14 extending normal to fold line 13 to provide contoured rib portions 16 integral with and extending along opposite sides of the strip.

To assemble contour member 11 (FIGURE 4), it only is necessary to fold the portions of the strip on oppohite sides of fold line 13 into facing relationship with each other and to fold the rib portion 16 about fold lines 14 into positions normal to the panel strip with the ribs of one portion of the strip extending in a direction opposite to the direction in which the ribs of the other portion extend. Contour member 11 can then be inserted into engagement with a support member 7 to envelope opposite walls thereof with the rib portions 16 extending normal to such walls to engage against the lateral sides of the pleats of the filter medium, as described hereinafter. Suitable fastening means, such as glue or staples, can be used to fasten the contour member 11 to its support member 7.

Referring to FIGURE 5 of the drawings, a continuous strip of suitable filter medium 17—for example, 80 FG fiber glass material— is disclosed as arranged in pleated form in open-ended frame 2. To prevent any bypassing of the fluid stream to be filtered by medium 17, the ends and edges of the medium are sealed to the inside walls of frame 2 with the aid of some suitable adhesive. It is to be noted that in the embodiment of the structure of FIGURE 5, support members 7 are arranged to extend in parallel, supporting relationship along the length of the crests of the pleated filter medium at the upstream end of the frame only and that the crests of the medium at the downstream end of the frame are relatively unsupported. This arrangement permits ready and efficient loading of the medium into frame 2, it being a comparatively simple operation to tuck the pleats of the medium into the open frame from the upstream side thereof between the upstream ends of supports 7. Further, by leaving the crests of the medium at the downstream end of the frame relatively unsupported and thus unobstructed, it is possible to obtain additional face area of medium to the fluid stream to be treated. In this connection, it is to be noted that rib portions 16 of pleat contour member 11 are contoured in a preselected manner to support the lateral sides of the pleats extending from the upstream crests of medium 17 in a preselected pleat shape against the pressure of the fluid stream to be treated. In accordance with the present invention, it is recognized that if the lateral sides of the pleats were not so supported adjacent the upstream crests by supported members 7 and rib portions 16, a high pressure drop across the filter medium during filtering operations would tend to urge the opposite lateral sides of each pleat toward each other so as to result in increasing filter resistance. It also is recognized by the present invention that the lateral sides of each pleat adjacent its crest at the downstream end of frame 2, on the other hand, would be urged away from each other by any such high pressure drop and that such support members and ribs not only are not required in many operating situations but, by their elimination, additional face area of the filter medium to the fluid stream to be treated can be obtained. It is to be understood that, in erecting the unit filter assembly structure of FIGURES 1–5, it is possible to assemble pleat contour members 11 with their support members 7 either before or after filter medium 17 has been inserted into proper position in frame 2.

It is to be noted that, if desired, an outer open-ended frame member 18 can be provided to telescopically engage in mating relationship with frame 2 as a further structural reinforcement for the overall assembly (FIGURE 5). Like border member 6 of frame 2, frame 18 can be provided with a border member 19 surrounding one of the open ends thereof, such border members serving to support the ends of the crests of the pleated filter medium.

Referring to FIGURE 6 of the drawings, the open-ended frame of the inventive assembly and the spaced support members disposed in such frame are disclosed as being both erected from a single continuous strip 19 of sturdy, pliant material, such as the aforementioned chipboard or cardboard. More specifically strip 19 can be scored to include integral end-to-end portions 21 and 22. Portion 21 of strip 19 can be scored into panels and folded to form the four wall open-ended rectangular frame of the unit assembly. Portion 22, which is integral with portion 21 of strip 19, also can be scored into panels and folded in serpentine form to provide spaced, parallel support members extending between opposite side walls of the open-ended frame and intermediate members which can be fastened to the inner walls of the open-ended frame by some suitable means such as gluing or stapling. Thus, with the use of a continuous strip of sturdy, pliant material, it is possible to erect the open-ended frame and support members in an efficient, economical and uninterrupted folding operation. It is to be noted that the scoring and folding arrangement abovedescribed for erecting the frame and support members from a continuous strip can be varied to some degree if desired. For example, instead of scoring the continuous strip to permit folding of the outer frame first, as described, it is possible to score the strip so as to permit folding one or two side walls first, then the supporting members and intermediate members, and finally the remaining walls of the outer frame.

In FIGURES 7 and 8 of the drawings, a further modification of the present invention is disclosed. In this modification, the pleat contour means include the face panels 24 having ribs 26 extending along opposite sides thereof and normal thereto. As can be seen in FIGURE 8, it is only necessary to staple (or glue) panel portions 24 into facing relationship with support members 27 of continuous strip 28 in order to erect the pleat support and contour structure of the inventive unit assembly.

In FIGURE 9, a still further modification of the pleat contour means is disclosed. In this modification, panel strip 31 has integral with and extending therefrom a plurality of spaced fingers 32. Fingers 32 are slotted as at 33 to form ribs which serve to support the lateral sides of the pleats of the filter medium. The fingers 32 are so spaced from each other that the slots 33 therein engage with support members 34 of a continuous strip 36 when the panel strip 31 is erected into interlocking position with the strip transverse support members 34. In this connection, it is to be noted that support members 34 of strip 36 are provided, in turn, with slots 37 to receive the interlocking panel strip 31 in egg-crate fashion.

Referring to FIGURE 10, still a further modification of the present invention is disclosed, the present invention recognizing that, in some instances, it is desirable to provide an open-ended pleated unit filter assembly wherein either end of the assembly can serve as the upstream end. To accomplish this, it also is recognized that it is important that the crests of the pleats at both ends of the open-ended frame of the assembly be supported. The structure of FIGURE 10 teaches a simple, straightforward manner of so supporting such crests by utilizing the above-described inventive features in a modified manner. In this modification, an open-ended frame 38 is provided having at one open end a narrow, continuous strip 39 of sturdy, pliant material extending back and forth between opposite walls of the frame 38 in serpentine form to provide a plurality of spaced, parallel support members 41 which can nest in parallel, supporting relationship with the crests of a filter medium to be disposed in pleated form within the frame. At the other open-end of frame 38, a second narrow continuous strip 42 of sturdy, pliant material is provided. Like strip 39, strip 42 is arranged to extend back and forth between opposite walls of frame 38 in serpentine form to provide a plurality of spaced parallel support members 43. However, it is to be noted that strip 42 is so scored and folded that support members 43 are slightly offset from corresponding support members 41 whereby such support members 43 can nest at the other end of frame 38 in parallel supporting relationship with the crests of the filter medium to be disposed in pleated form within the frame. It also is to be noted that both strips 39 and 42, like the continuous strips described for the structures of FIGURES 1–9, can be fastened to the opposite walls of the frame intermediate their spaced support members 41 and 43 respectively. Once strips 39 and 42 have been properly inserted in frame 38, it is then a simple operation to pass the filter medium back and forth in pleated form within the frame with support members 41 and 43 nesting in the crests of the pleats.

In FIGURE 11 of the drawings, a still further modification of the present invention is disclosed. In this modification, offset support members for the filter media crests similar to those taught by the structure of FIGURE 10 are both provided from a same continuous sheet of sturdy, pliant material 44. Sheet 44, which is disposed in a suitable open-ended frame similar to that of FIGURE 1, is longitudinally divided to include two strips of material 46 and 47. Strip 46 extends back and forth between opposite walls of the frame in serpentine form to provide the spaced parallel support members 48 which nest at one end of the frame in supporting relationship with the crests of pleated filter medium disposed within the frame. Strip 47 also extends back and forth between opposite walls of the frame in serpentine form to provide spaced, parallel support members 49 which nest at the other end of the frame in supporting relationship with the crests of the pleated filter medium at such end. In this connection, it is to be noted that strip 47 is so folded with respect to strip 46 as to permit such nesting, the support members 49 being offset from corresponding support members 48 of strip 46. It is to be understood that, like support strips 39 and 42 of FIGURE 10, strips 46 and 47 are fastened to opposite walls of the frame intermediate their spaced support members 48 and 49 respectively.

The invention claimed is:

1. A unit filter assembly comprising an open-ended frame, a filter medium disposed in said frame in pleated form across the fluid stream to be treated with the edges and ends of said filter medium being sealed to the inside walls of said frame, a plurality of spaced support members extending between the walls of said frame in parallel supporting relationship along the length of the crests of said pleats of said medium at least at one of the open ends of said frame and pleat contour means cooperating with said support members to extend in fixed manner therefrom in substantially line contact with the downstream face of the lateral sides of said pleats, said pleat contour means tapering outwardly from the crests of said pleats along the lateral sides thereof to maintain the lateral sides of said pleats adjacent the supported crests in preselected tapered contour form against the pressure of the fluid stream to be treated.

2. A unit filter assembly comprising an open-ended frame, a filter medium disposed in said frame in pleated form across the fluid stream to be treated with the edges and ends of said filter medium being sealed to the inside walls of said frame, a plurality of spaced support members extending between the walls of said frame in supporting relationship with the crests of said pleats at the upstream end of said frame only, the crests of said pleats at the downstream end of said frame being relatively unsupported, and pleat contour means cooperating with said support members to extend in fixed manner therefrom in substantially line contact with the downstream face of the lateral sides of said pleats, said pleat contour means tapering outwardly from the crests of said pleats along the lateral sides thereof to maintain the lateral sides of said pleats adjacent the upstream crests of said pleated filter medium in preselected tapered contoured form against the pressure of the fluid stream to be treated.

3. A unit filter assembly comprising an open-ended frame, a filter medium disposed in said frame in pleated form across the fluid stream to be treated with the edges and ends of said filter medium being sealed to the inside walls of said frame, and a continuous strip of sturdy, pliant material extending back and forth between and in abutting relationship with opposite walls of said frame in serpentine form to provide a plurality of spaced support members in supporting relationship with the crests of said filter medium at least at one end of said frame, said strip being fastened to said opposite walls of said frame intermediate the spaced support members.

4. A unit filter assembly comprising an open-ended frame, a filter medium disposed in said frame in pleated form across the fluid stream to be treated with the edges and ends of said filter medium being sealed to the inside walls of said frame, a continuous strip of sturdy, pliant material extending back and forth between opposite walls of said frame in serpentine form to provide a plurality of spaced support members in supporting relationship with the crests of said filter medium at at least one of the open ends of said frame, said strip being fastened to such opposite walls of said frame intermediate the spaced support members, and pleat contour means cooperating with said support member portions to maintain the crests of said pleated filter medium in preselected contoured form against the pressure of the fluid stream to be treated.

5. A unit filter assembly comprising an open-ended frame, a filter medium disposed in said frame in pleated form across the fluid stream to be treated with the edges and ends of said filter medium being sealed to the inside walls of said frame, a plurality of spaced support members extending between the walls of said frame in parallel supporting relationship along the length of the crests of said pleats of said filter medium at at least one of the open ends of said frame, and spaced rib members extending in fixed manner from said support members in substantially line contact with the downstream face of the lateral sides of said pleats, said rib members tapering outwardly from the crests of said pleats along the lateral sides thereof to maintain the lateral sides of said pleats adjacent the supported crests in preselected tapered contoured form against the pressure of the fluid stream to be treated.

6. A unit filter assembly comprising an open-ended frame, a filter medium disposed in said frame in pleated form across the fluid stream to be treated with the edges and ends of said filter medium being sealed to the inside walls of said frame, a plurality of spaced support members extending between the walls of said frame in parallel supporting relationship along the length of the crests of said pleats of said filter medium at at least one of the open ends of said frame, and pleat contour means cooperating with said support members to maintain the crests of said pleated filter medium in preselected contoured form against the pressure of the fluid stream to be treated, said pleat contour means including face panels adapted to be fastened in faced relationship to the walls of said support members, said face panels having contoured rib portions integral with and extending along opposite sides thereof in spaced relationship from each other and normal to the walls of said support members to engage against the lateral sides of said pleats.

7. The apparatus of claim 6, said face panels comprising panel strips, each having a transverse fold line intermediate its extremities, the portions on opposite sides of said fold line being folded into mating engagement with each other about said fold line to envelope opposite walls of a support member.

8. A unit filter assembly comprising an open-ended frame, a filter medium disposed in said frame in pleated form across the fluid stream to be treated with the edges and ends of said filter medium being sealed to the inside walls of said frame, a plurality of spaced support members extending between the walls of said frame in parallel supporting relationship along the length of the crests of said pleats of said filter medium at at least one of the open ends of said frame, and pleat contour means cooperating with said support members to maintain the crests of said pleated filter medium in preselected contoured form against the pressure of the fluid stream to be treated, said pleat contour means including a panel member extending between the walls of said frame transverse said parallel support members, said panel members having extending therefrom a plurality of spaced, slotted, rib forming fingers, each finger being adapted to engage with a support member to provide rib portions normal to and along opposite walls of said support members to engage against the lateral sides of said pleats.

9. A unit filter assembly comprising a continuous strip of sturdy, pliant material, a portion of said continuous strip of material being arranged to form an open-ended frame with the remaining portion of said continuous strip of material extending back and forth between and in abutting relationship with opposite walls of said frame in serpentine form to provide a plurality of spaced support members, said remaining portion of said strip being fastened to such opposite walls of said frame intermediate the spaced support members and a filter medium disposed in said frame in pleated form across the fluid stream to be treated with the edges and ends of said filter medium being sealed to the inside walls of said frame, said spaced support members serving to support the crests of said filter medium at at least one of the open ends of said frame.

10. A unit filter assembly comprising an open-ended frame, a filter medium disposed in said frame in pleated form across the fluid stream to be treated with the edges and ends of said filter medium being sealed to the inside walls of said frame, a continuous strip of sturdy, pliant material extending back and forth between opposite walls of said frame in serpentine form to provide a plurality of spaced support members in supporting relationship with the crests of said filter medium at at least one end of said frame, and spaced rib members extending from said support members to maintain the lateral sides of said pleats adjacent the supported crests in preselected contoured form against the pressure of the fluid stream to be treated.

11. A unit filter assembly comprising an open-ended frame, a filter medium disposed in said frame in pleated form across the fluid stream to be treated with the edges and ends of said filter medium being sealed to the inside walls of said frame, a first continuous strip of sturdy, pliant material extending back and forth between opposite walls fo said frame in serpentine form to provide a plurality of spaced support members in supporting relationship with the crests of said filter medium adjacent one open end of said frame, a second continuous strip of sturdy, pliant material extending back and forth between opposite walls of said frame in serpentine form to provide a plurality of spaced support members offset from corresponding support members of said first continuous strip and in supporting relationship with the crests of said filter medium adjacent the other open-end of said frame, said strips being fastened to opposite walls of said frame intermediate their spaced support members.

12. A unit filter assembly comprising an open-ended frame, a filter medium disposed in said frame in pleated form across the fluid stream to be treated with the edges and ends of said filter medium being sealed to the inside walls of said frame, a continuous strip of sturdy, pliant material extending back and forth between opposite walls of said frame in snake-like form to provide a plurality of spaced support members in supporting parallel relationship along the crests of said filter medium at the upstream end of said frame, said strip being fastened to opposite walls of said frame intermediate the spaced support members, and pleat contour means cooperating with said support members to maintain the crests of said pleated filter medium in preselected form against the pressure of the fluid stream to be treated, said pleat contour means including panel strips having contoured rib portions integral with and extending along opposite sides thereof in spaced relationship from each other and normal to said panel strip, each of said panel strips having a transverse fold line intermediate its extremities, the portions on opposite sides of said fold line being folded into mating engagement with each other about said fold line to envelope opposite walls of a support member whereby said rib portions engage against the lateral sides of said pleats.

13. A unit filter assembly comprising an open-ended frame, a filter medium disposed in said frame in pleated form across the fluid stream to be treated with the edges and ends of said filter medium being sealed to the inside walls of said frame, and a continuous sheet of sturdy, pliant material disposed within said frame, said sheet of material being longitudinally divided to include a first strip of material extending back and forth between opposite walls of said frame in serpentine form to provide a plurality of spaced support members in supporting relationship with the crests of said filter medium adjacent one open end of said frame and a second strip of material extending back and forth between opposite walls of said frame in serpentine form to provide a plurality of spaced support members offset from corresponding support members of said first strip and in supporting relationship with the crests of said filter medium adjacent the other open-end of said frame, said strips being fastened to opposite walls of said frame intermediate their spaced support members.

References Cited in the file of this patent

UNITED STATES PATENTS

| | | |
|---|---|---|
| 2,008,751 | Davis | July 23, 1935 |
| 2,082,481 | Christofferson | June 1, 1937 |
| 2,410,371 | Vokes | Oct. 29, 1946 |
| 2,907,408 | Engle et al. | Oct. 6, 1959 |
| 2,973,828 | Engle | Mar. 7, 1961 |